United States Patent
Wolafka et al.

(10) Patent No.: US 8,484,213 B2
(45) Date of Patent: Jul. 9, 2013

(54) HETEROGENOUS HIGH AVAILABILITY CLUSTER MANAGER

(75) Inventors: Rainer Wolafka, San Jose, CA (US);
Maria Savarimuthu Rajakannimariayn, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1614 days.

(21) Appl. No.: 11/216,687

(22) Filed: Aug. 31, 2005

(65) Prior Publication Data

US 2007/0067318 A1    Mar. 22, 2007

(51) Int. Cl.
| | |
|---|---|
| G06F 7/00 | (2006.01) |
| G06F 17/30 | (2006.01) |
| G06F 13/00 | (2006.01) |
| G06F 13/28 | (2006.01) |
| G06F 15/167 | (2006.01) |
| G06F 15/173 | (2006.01) |

(52) U.S. Cl.
USPC .......... 707/737; 707/705; 711/100; 709/212; 709/213; 709/223

(58) Field of Classification Search
USPC ........................................................ 707/100
See application file for complete search history.

(56) References Cited

U.S. PATENT DOCUMENTS

| | | | |
|---|---|---|---|
| 5,287,453 A * | 2/1994 | Roberts ................... | 709/201 |
| 5,659,788 A | 8/1997 | Someya et al. | |
| 6,101,508 A * | 8/2000 | Wolff .................... | 709/223 |
| 6,356,915 B1 | 3/2002 | Chtchetkine et al. | |
| 6,389,459 B1 * | 5/2002 | McDowell ............... | 709/216 |
| 6,574,477 B1 * | 6/2003 | Rathunde ................ | 455/453 |
| 6,681,310 B1 | 1/2004 | Kusters et al. | |
| 6,934,768 B1 * | 8/2005 | Block et al. .............. | 709/248 |
| 6,983,324 B1 * | 1/2006 | Block et al. .............. | 709/228 |
| 7,068,597 B1 * | 6/2006 | Fijolek et al. ............ | 370/230 |
| 7,069,385 B2 * | 6/2006 | Fujimoto et al. .......... | 711/119 |
| 7,120,739 B2 * | 10/2006 | Fujimoto et al. .......... | 711/113 |
| 7,152,185 B2 * | 12/2006 | Srivastava et al. .......... | 714/24 |
| 7,225,244 B2 * | 5/2007 | Reynolds et al. .......... | 709/223 |
| 7,249,220 B2 * | 7/2007 | Fujimoto et al. .......... | 711/113 |
| 7,401,120 B2 * | 7/2008 | Walbeck et al. .......... | 709/203 |
| 7,656,788 B2 * | 2/2010 | Ma et al. ................. | 370/219 |
| 7,739,541 B1 * | 6/2010 | Rao et al. ................ | 714/4.1 |
| 7,873,700 B2 * | 1/2011 | Pawlowski et al. ........ | 709/213 |
| 2002/0007468 A1 * | 1/2002 | Kampe et al. ............ | 714/4 |
| 2002/0049845 A1 * | 4/2002 | Sreenivasan et al. ...... | 709/226 |

(Continued)

FOREIGN PATENT DOCUMENTS

| | | |
|---|---|---|
| EP | 1234237 B1 | 1/2004 |
| JP | 6301436 | 10/1994 |

(Continued)

*Primary Examiner* — Krista Zele
*Assistant Examiner* — Tariq Najee-Ullah
(74) *Attorney, Agent, or Firm* — Kunzler Law Group, PC (57) ABSTRACT

A heterogeneous high availability cluster manager implements a method involving a reception of a first cluster management command in a first cluster management protocol, a conversion of the first cluster management command to a second cluster management command in a second cluster management protocol, and a sending of the second cluster management command to a first node in a heterogeneous cluster management group. To facilitate the conversion of the first cluster management command to the second cluster management command, the second cluster management protocol is registered with the manager whereby the first cluster management command is mapped to the second management command.

17 Claims, 10 Drawing Sheets

U.S. PATENT DOCUMENTS

| | | | |
|---|---|---|---|
| 2002/0120717 A1* | 8/2002 | Giotta | 709/219 |
| 2003/0115157 A1* | 6/2003 | Circenis | 705/400 |
| 2003/0163755 A1* | 8/2003 | Fung et al. | 714/4 |
| 2003/0172145 A1* | 9/2003 | Nguyen | 709/223 |
| 2004/0010545 A1* | 1/2004 | Pandya | 709/203 |
| 2004/0030668 A1* | 2/2004 | Pawlowski et al. | 707/1 |
| 2004/0030822 A1* | 2/2004 | Rajan et al. | 711/4 |
| 2004/0221105 A1* | 11/2004 | Fujimoto et al. | 711/114 |
| 2004/0221261 A1 | 11/2004 | Blevins | |
| 2005/0015460 A1* | 1/2005 | Gole et al. | 709/213 |
| 2005/0038789 A1* | 2/2005 | Chidambaran et al. | 707/10 |
| 2005/0038834 A1* | 2/2005 | Souder et al. | 707/203 |
| 2005/0038835 A1* | 2/2005 | Chidambaran et al. | 707/203 |
| 2005/0141499 A1* | 6/2005 | Ma et al. | 370/389 |
| 2005/0160424 A1* | 7/2005 | Broussard et al. | 718/1 |
| 2005/0192932 A1* | 9/2005 | Kazar et al. | 707/1 |
| 2005/0234846 A1* | 10/2005 | Davidson et al. | 707/1 |
| 2005/0235081 A1* | 10/2005 | Fujimoto et al. | 710/74 |
| 2005/0243830 A1* | 11/2005 | Wrenn et al. | 370/394 |
| 2006/0184731 A1* | 8/2006 | Corbett et al. | 711/114 |
| 2006/0242361 A1* | 10/2006 | Fujimoto et al. | 711/114 |
| 2006/0248273 A1* | 11/2006 | Jernigan et al. | 711/114 |
| 2006/0248379 A1* | 11/2006 | Jernigan, IV | 714/6 |
| 2007/0016667 A1* | 1/2007 | Fujimoto et al. | 709/223 |
| 2007/0245063 A1* | 10/2007 | Fujimoto et al. | 711/100 |
| 2008/0270701 A1* | 10/2008 | Fujimoto et al. | 711/119 |
| 2009/0037367 A1* | 2/2009 | Wein | 707/2 |

FOREIGN PATENT DOCUMENTS

| | | |
|---|---|---|
| JP | 7250123 | 9/1995 |
| JP | 2003006067 | 1/2003 |
| WO | WO 02/39351 A2 | 5/2002 |
| WO | WO 03/060751 A1 | 7/2003 |
| WO | WO 2004/061647 A2 | 7/2004 |
| WO | 2006/005047 A2 | 1/2006 |

* cited by examiner

```xml
<?xml version="1.0" encoding="uUTF-8"?>

<HAManager version="1.0">
    <RegisteredVendors>
        <Vendor>
            <name>Microsoft</name>
            <product>MSCS</product>
            <version>3.0</version>
            <!-- Additional information -->

<CommandSet> <!-- The vendor propiartary command set (mapping) -->
                <offline parameters="...">mscs_offline</offline>
                <online parameters="...">mscs_online</online>
                <failover parameters="...">mscs_fo</failover>
                <failback parameters="...">mscs_fb</failback>
                <addNode parameters="...">mscs_addNode</addNode>
                <removeNode parameters="...">mscs_removeNode</removeNode>
                <createGroup parameters="...">mscs_createGrp</createGroup>
                <removeGroup parameters="...">mscs_removeGrp</removeGroup>
                <changeGroup parameters="...">mscs_changeGrp</changeGroup>
                <!-- Additional commands -->

</CommandSet>
        </vendor>

<vendor>
            <name>Veritas</name>
            <product>VCS</product>
            <version>4.0</version>
            <!-- Additional information -->

<CommandSet> <!-- The vendor propiartary command set (mapping) -->
                <offline parameters="...">grpOffline</offline>
                <online parameters="...">grpOnline</online>
                <failover parameters="...">grpFO</failover>
                <failback parameters="...">grpFB</failback>
                <addNode parameters="...">nodeAdd</addNode>
                <removeNode parameters="...">nodeRmremoveNode>
                <createGroup parameters="...">grpAdd</createGroup>
                <removeGroup parameters="...">grpRem</removeGroup>
                <changeGroup parameters="...">grpCh</changeGroup>
                <!-- Additional commands -->

</CommandSet>
        </vendor>

<!-- Other registered vendors -->

</RegisteredVendors>
</HAManager>
```

HETEROGENOUS HIGH AVAILABILITY CLUSTER MANAGER

FIELD OF INVENTION

The present invention generally relates to enterprise datacenters employing a heterogeneous server environment. The present invention specifically relates to high availability techniques implemented by the enterprise datacenters to protect services and data within the heterogeneous server environment.

BACKGROUND OF THE INVENTION

Figure 1:
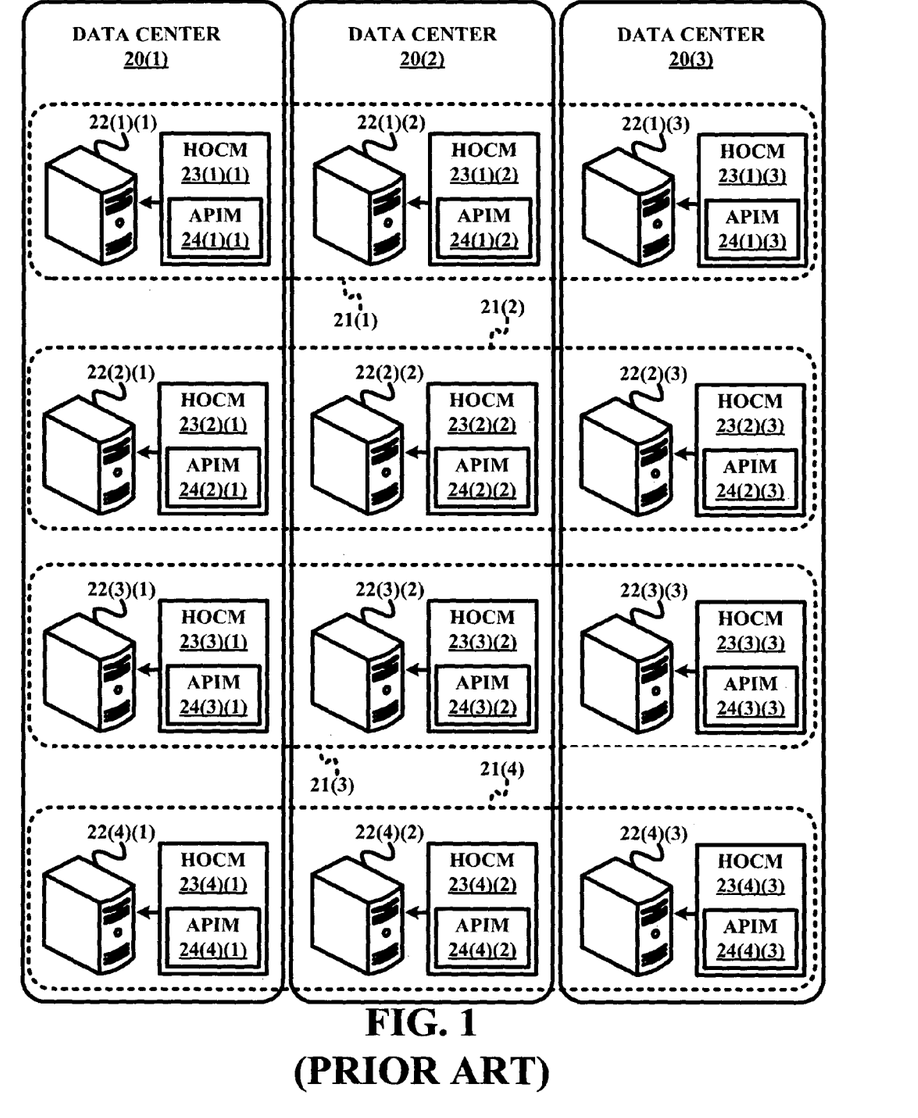
FIG. 1 illustrates an exemplary heterogeneous server environment as known in the art.

FIG. 1 illustrates three (3) enterprise datacenters 20 implementing a heterogeneous server environment consisting of four (4) homogenous high availability clusters 21. Each cluster 21 employs three (3) server nodes 22 and three (3) homogeneous high availability cluster managers ("HOCM") 23 equally distributed across enterprise datacenters 20. Each manager 23 is installed on an associated server node 22, and includes an application programming interface module ("APIM") 24 for receiving cluster management commands in accordance with a particular cluster management protocol. Examples of commercially available managers 23 include, but are not limited to, cluster managers sold by IBM, Microsoft, Veritas, Hewlett-Packard MCSG and Linux.

Enterprise datacenters 20 are located at different sites, physically or logically. As such, managers 23 of a cluster 21 are employed to protect services and data on the server nodes 22 within that cluster 21 across the different sites. In particular, managers 23 of a cluster 21 will cooperatively detect a problem with one of the server nodes 22 within that cluster 21 whereby resources (e.g., storage devices) associated with the problem server node 22 are transferred in accordance with one or more cluster management commands from the administrator to one of the remaining operating servers nodes 22 within that cluster 21. Furthermore, managers 23 of a cluster 21 will cooperatively facilitate one of the servers nodes 22 within that cluster 21 going offline for manual maintenance purposes whereby resources associated with the offline server node 22 are transferred in accordance with one or more cluster manager commands from the administrator to one of the remaining operating server nodes 22 within that cluster 21.

A drawback to exclusively implementing homogeneous high availability clusters 21 in this heterogeneous server environment is, in the case of a problem with one of the enterprise datacenters 20 (e.g., a natural disaster) or a need to perform a manual maintenance one of the enterprise datacenters 20, the administrator of the illustrated heterogeneous server environment has to manually manage each individual server node 22 on the subject datacenter 20 via its associated application programming interface module 24. This manual management of each individual server node 22 on the subject datacenter 20 can be difficult and time intensive as each application programming interface module 24 implements a different cluster management protocol for failover and high availability cluster administration.

For example, assuming datacenter 20(1) is active, datacenter 20(2) is inactive and for maintenance reasons the administrator has to perform a failover switch from datacenter 20(1) to datacenter 20(2), then the administrator must execute discrete cluster management commands in accordance with a distinct cluster management protocol for server node 22(1)(1) and server node 22(1)(2) within cluster 21(1), discrete cluster management commands in accordance with a distinct cluster management protocol for server node 22(2)(1) and server node 22(2)(2) within cluster 21(2), discrete cluster management commands in accordance with a distinct cluster management protocol for server node 22(3)(1) and server node 22(3)(2) within cluster 21(3), and discrete cluster management commands in accordance with a distinct cluster management protocol for server node 22(4)(1) and server node 22(4)(2) within cluster 21(4). Further assuming an equal duration T for each set of commands and a sequential execution of each set of commands, the duration for the administrator to complete the failover switch from datacenter 20(1) to datacenter 20(2) is equal to 4×T. Clearly, this process can involve a significant degree of complexity and consumes a significant amount of time.

A challenge therefore for the computer industry is to facilitate a reduction in the complexity and time duration of a high availability/failover implementation within the heterogeneous server environment.

SUMMARY OF THE PRESENT INVENTION

The present invention provides a new and unique heterogeneous high availability cluster manager that overcomes the aforementioned drawbacks.

One form of the present invention is a computer program product comprising a computer usable medium tangibly embodying at least one program of instructions executable by a computer to perform operations for receiving a first cluster management command in a first cluster management protocol, converting the first cluster management command to a second cluster management command in the second cluster management protocol, and sending the second cluster management command to a node in a heterogeneous cluster management group.

A second form of the present invention is server, employing a processor, and a memory storing instructions operable with the processor, the instructions being executed for receiving a first cluster management command in a first cluster management protocol, converting the first cluster management command to a second cluster management command in the second cluster management protocol, and sending the second cluster management command to a node in a heterogeneous cluster management group.

A third form of the present invention is a method for receiving a first cluster management command in a first cluster management protocol, converting the first cluster management command to a second cluster management command in the second cluster management protocol, and sending the second cluster management command to a node in a heterogeneous cluster management group.

The forgoing forms and other forms, objects, and aspects as well as features and advantages of the present invention will become further apparent from the following detailed description of the various illustrated embodiments of the present invention, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 8 illustrates one embodiment of a Extensible Markup Language mapping file in accordance with the present invention;

DETAILED DESCRIPTION OF THE PRESENT INVENTION

Figure 2:
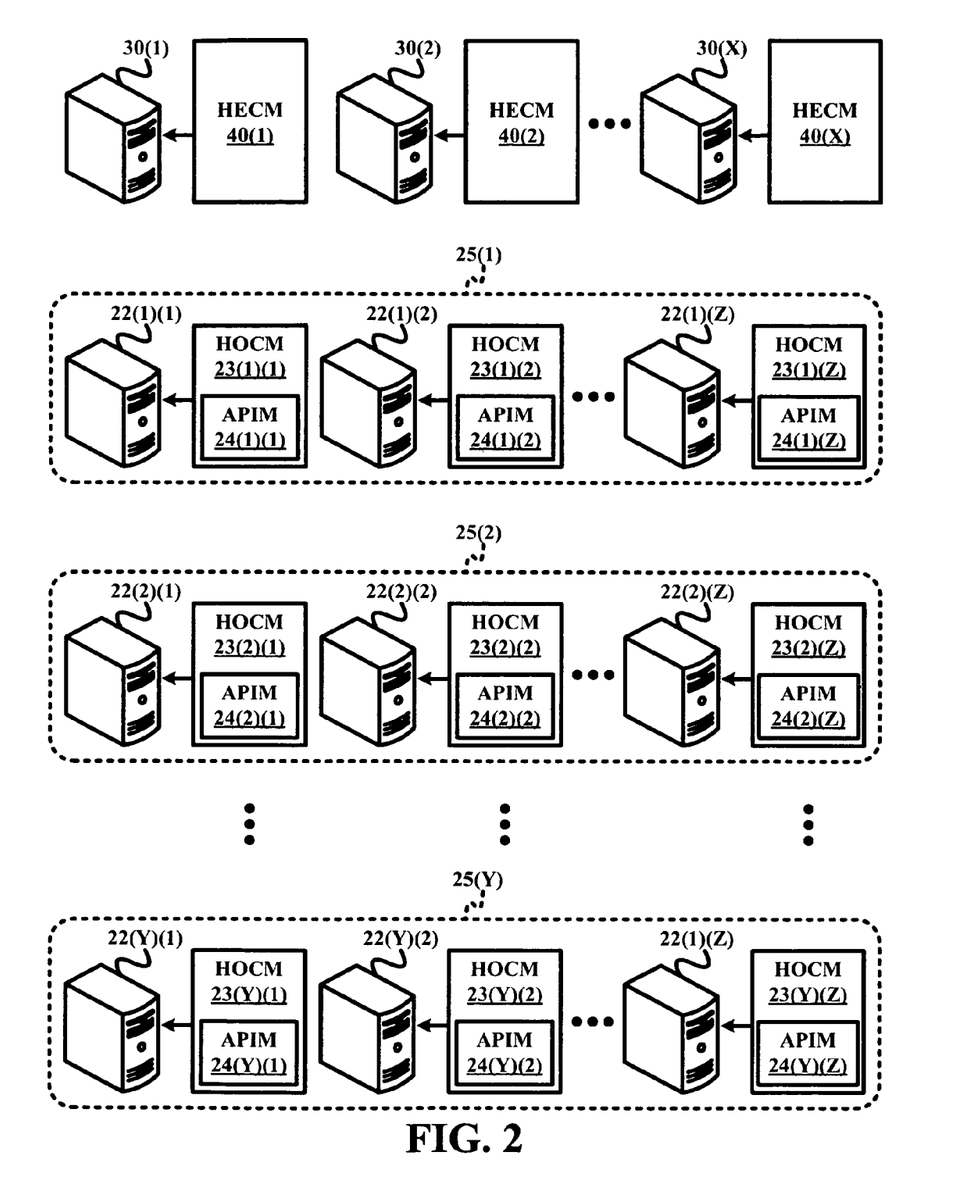
FIG. 2 illustrates one embodiment of a heterogeneous server pool in accordance with the present invention.

FIG. 2 illustrates a heterogeneous high availability server pool of the present invention consisting of an X number of heterogeneous cluster management server nodes 30, where $X \geq 1$, and a Y number of homogenous high availability clusters 25 where $Y \geq 2$, with each homogenous high availability cluster 25 consisting of a Z number of homogeneous high availability server nodes 22, where $Z \geq 1$.

Each homogenous high availability cluster 25 incorporates one or more highly available information technology ("IT") applications (not shown) installed on server nodes 22 for purposes of providing a particular service and/or data, such as, for example, a database application and a web server application.

Each homogenous high availability cluster 25 further incorporates homogeneous high availability cluster managers ("HOCM") 23 with each cluster manager 23 being installed on an associated server node 22, and including an application programming interface module ("APIM") 24 for receiving cluster management commands in accordance with a particular cluster management protocol. Cluster managers 23 of a cluster 25 provide a discrete set of cluster management commands in accordance with a distinct cluster management protocol for the server nodes 22 of the particular cluster 25. Specifically, cluster managers 23(1) of cluster 25(1) provide a discrete set of cluster management commands in accordance with a distinct cluster management protocol for server nodes 22(1)(1)-22(1)(Z) within cluster 25(i), cluster managers 23(2) of cluster 25(2) provide a discrete set of cluster management commands in accordance with a distinct cluster management protocol for server nodes 22(2)(1)-22(2)(Z) within cluster 25(2), and so on and so on as applicable.

To manage cluster 25(1)-25(Y) into one or more heterogeneous cluster management groups in accordance with the present invention, each cluster managing server node 30 has a heterogeneous cluster manager ("HECM") 40 of the present invention installed thereon. Each HECM 40 serves as an abstraction layer that provides a centralized, common interface to the different cluster command protocols provided by the different cluster managers 23. Thus, as will be appreciated by those having ordinary skill in the art, HECMs 40 eliminate a need to transmit separate cluster management commands to the application programming interface modules 24 of the different cluster managers 23.

In practice, a structural configuration of a HECM 40 of the present invention is dependent upon the commercial implementation of the HECM 40. For example, HECM 40 can be structurally configured as separate and distinct hardware installed on an associated server node 30, as software installed in a computer usable storage medium such as the memory of an associated server node 30, or as any combination thereof. The present invention therefore does not impose any limitations or any restrictions to the structural configuration of a HECM 40 of the present invention. Thus, the following description of one embodiment of a HECM 40 of the present invention as illustrated in FIG. 4 does not limit or restrict the scope of the possible structural configurations of a HECM 40 of the present invention.

Figure 3:
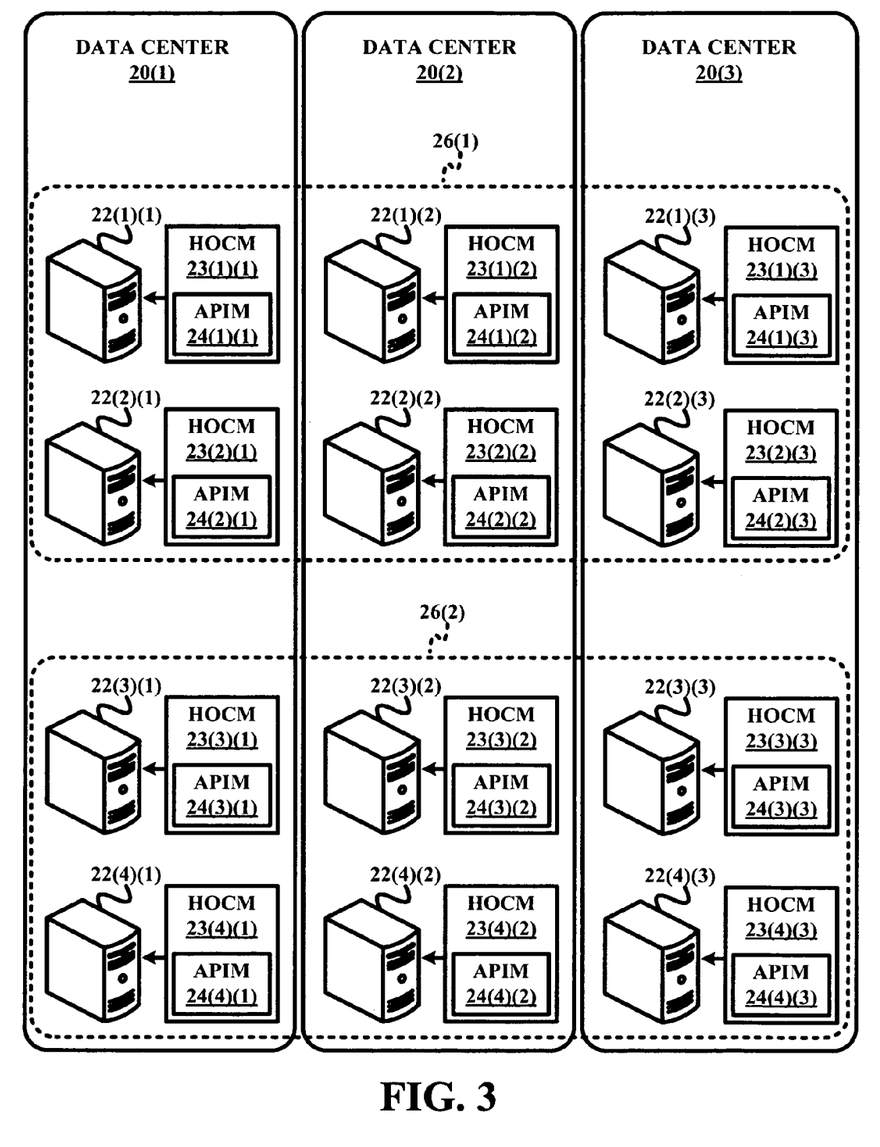
FIG. 3 illustrates an exemplary heterogeneous server environment in accordance with the present invention.
Figure 4:
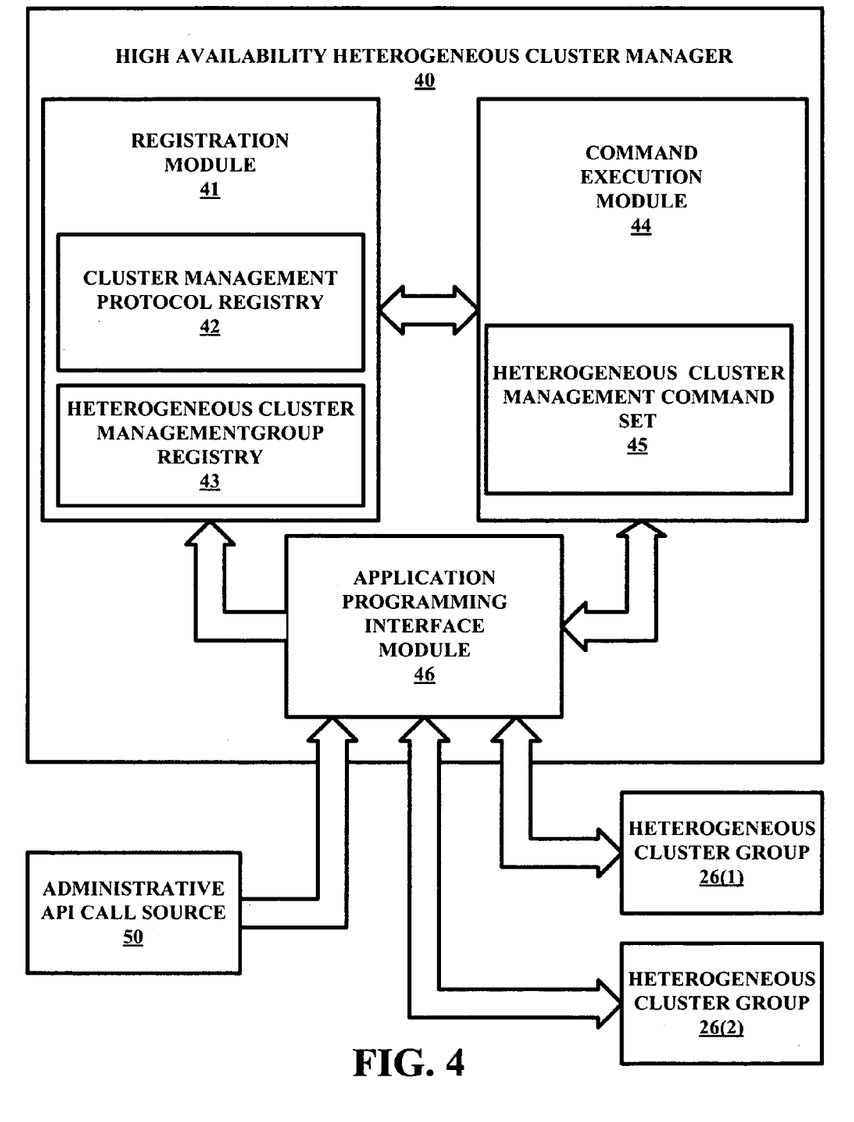
FIG. 4 illustrates one embodiment of a heterogeneous high availability cluster manager in accordance with the present invention.

To facilitate an understanding of the FIG. 4 illustrated embodiment of a HECM 40 of the present invention, FIGS. 4-9 will now be described herein in the context of a heterogeneous server environment illustrated in FIG. 3 that employs three (3) datacenters 20 and two (2) heterogeneous cluster management groups 26. Each heterogeneous cluster management group 26 includes two different homogeneous high availability clusters with each cluster employing three (3) server nodes 22 and three (3) homogeneous high availability cluster managers ("HOCM") 23 equally distributed across enterprise datacenters 20. Specifically, heterogeneous cluster management group 26(1) has different server nodes 22(1)(1) and 22(2)(1) located at datacenter 20(1), different server nodes 22(1)(2) and 22(2)(2) located at datacenter 20(2), and different server nodes 22(1)(3) and 22(2)(3) located at datacenter 20(3). Similarly, heterogeneous cluster management group 26(2) has different server nodes 22(3)(1) and 22(4)(1) located at datacenter 20(1), different server nodes 22(3)(2) and 22(4)(2) located at datacenter 20(2), and different server nodes 22(3)(3) and 22(4)(3) located at datacenter 20(3).

Referring to FIG. 4, the illustrated embodiment of manager 40 includes a registration module 41, a command execution module 44, and an application programming interface module 45. Registration module 41 implements a registration method of the present invention as represented by a flowchart 60 illustrated in FIG. 5, and command execution module 45 implements a command execution method of the present invention as represented by a flowchart 90 illustrated in FIG. 10. To this end, as will be appreciated by those having ordinary skill in the art, registration module 41 maintains a cluster management protocol registry 42 and a heterogeneous cluster management group registry 43, and command execution module 44 maintains a heterogeneous cluster management command set 45 for facilitating the HECM 40 in servicing as a centralized, common interface to the different cluster management protocols implemented by the server nodes 22 of cluster groups 26(1) and 26(2) for purposes of executing cluster management commands generated by an administrative API call source 50 (e.g., an administration workstation located at one of the datacenters 20 shown in FIG. 3).

Specifically, command set 45 is based on a common core functionality required for HECM 40 in providing a high availability services for heterogeneous cluster groups 26. In one embodiment, the common core functionality includes cluster group functions, highly available resources functions and server node functions. The cluster group functions consists of a cluster group creation, a cluster group deletion, a cluster group modification, a cluster group start, a cluster group stop, a cluster group/attribute/policy definition and a cluster group/attribute/policy modification. The highly available resources functions consist of a highly available resources creation, a highly available resources deletion and a highly available resources modification. The server node functions consist of an activating server node, a deactivating server node and a switching server nodes. Registry 42 is established and maintained based on the common core functions of the command set 45.

Figure 5:
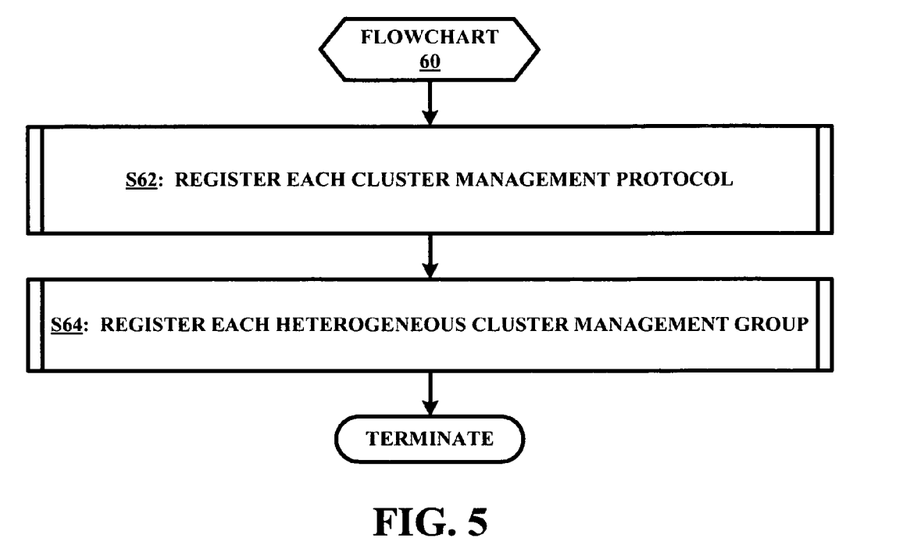
FIG. 5 illustrates a flowchart representative of one embodiment of a heterogeneous server environment registration method in accordance with the present invention.

Referring to FIGS. 4 and 5, a stage S62 of flowchart 60 encompasses registration module 41 registering each cluster management protocol in registry 42. In the context of FIG. 3, registration 42 would include registrations of a distinctive cluster management protocol of server nodes 22(1) (e.g., a protocol for IBM High Availability Cluster Microprocessing), a distinctive cluster management protocol of nodes 22(2) (e.g., a protocol for Microsoft Cluster Servers), a distinctive cluster management protocol of nodes 22(3) (e.g., a protocol for Veritas Cluster Servers) and a distinctive cluster management protocol of nodes 22(4) (e.g., a protocol for Hewlett Packard MCSG).

Figure 6:
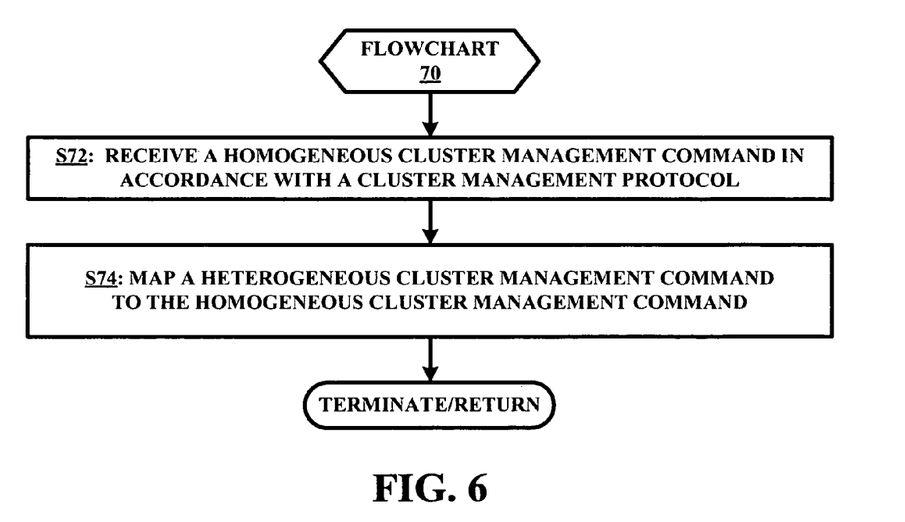
FIG. 6 illustrates a flowchart representative of one embodiment of a cluster management protocol registration method in accordance with the present invention.

FIG. 6 illustrates a flowchart 70 representative of one embodiment of stage S62 of flowchart 60. Referring additionally to FIG. 6, a stage S72 of flowchart 70 encompasses registration module 41 receiving a homogeneous cluster management command, and a stage S74 of flowchart 70 encompasses registration module 41 mapping a heterogeneous cluster management command from command set 45 to the received homogeneous cluster management command with registration module 41 factoring the different cluster command protocols into the mapping of the received homogeneous cluster management command.

Figure 7:
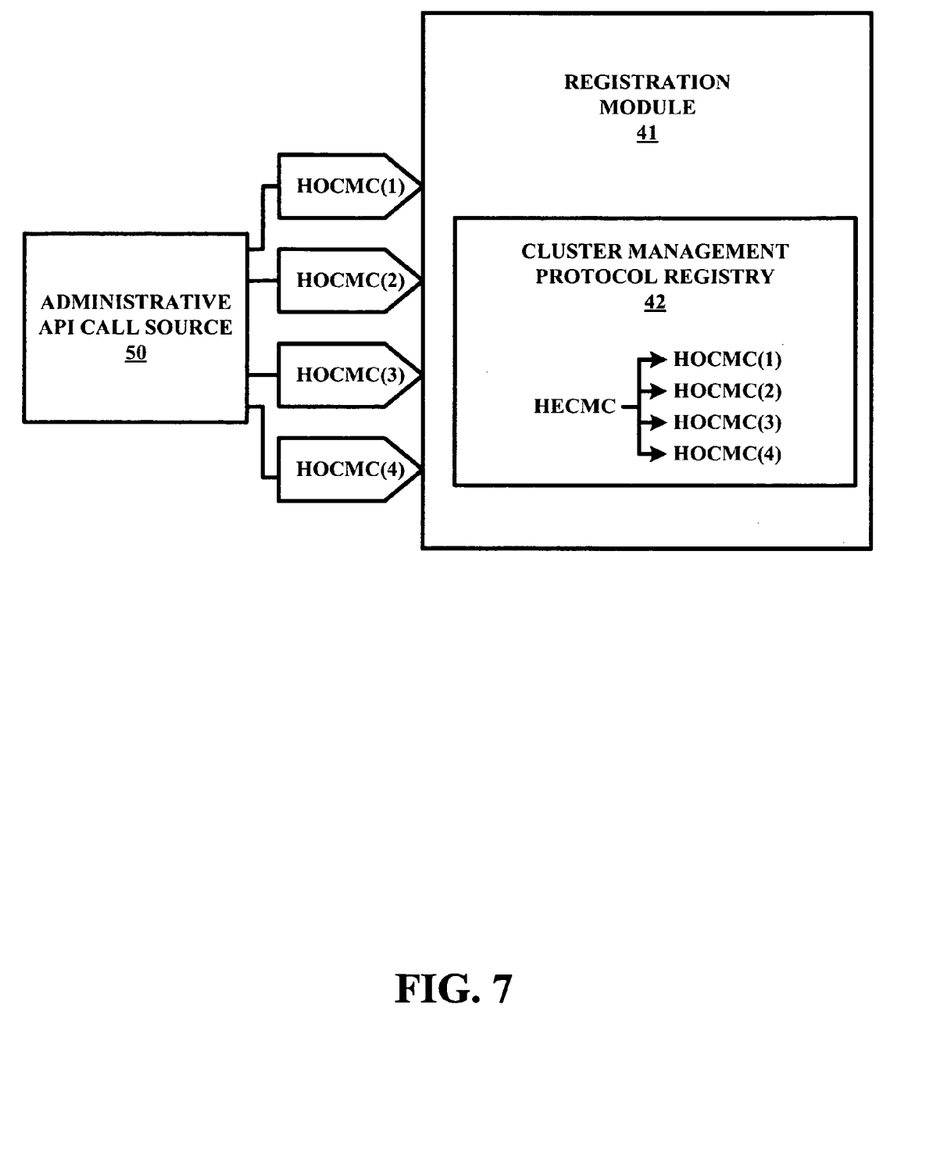
FIG. 7 illustrates an exemplary execution of the flowchart illustrated in FIG. 6 in the context of the exemplary heterogeneous server environment illustrated in FIG. 3.

For example, as shown in FIG. 7, registration module 41 can map a heterogeneous cluster management command ("HECMC") from command set 45 to the same homogeneous cluster management command ("HOCMC") from managers 23 with each HOCMC being in accordance with a different cluster management protocol. In particular, HOCMCs (1)-(4) can be highly available failover commands with HOCMC(1)-HOCMC(4) having <group name> and <a target node> command implementations and HOCMC(4) additionally having <a delay> and <autoOnline> command implementations. As such, registration module 41 factors in the different structures of the cluster group move commands by setting default values for the <delay> and <autoOnline> command implementations (e.g., "0" and "Yes", respectively) of HOCMC(4) to facilitate a simultaneous call execution of HOCMC(4) with one or more of the other HOCMCs(1)-(3) by command execution module 44 in dependence upon the heterogeneous cluster management grouping of the underlying server nodes 22.

Referring again to FIG. 4, in one embodiment, registration module 41 can maintain registry 42 with a Extensible Markup Language ("XML") file of any type of structure and format that is presented via a graphical user interface ("GUI") to source 50. For example, registration module 41 can maintain registry 42 with a XML file 142 shown FIG. 8. XML file 142 is structured and formatted based on a mapping of a heterogeneous cluster management command set 144 to an homogeneous cluster management command set 145 for a Microsoft MSCS vendor product provided by source 50 via the GUI, a mapping of a heterogeneous cluster management command set 144 to a homogeneous cluster management command set 146 for a Veritas VCS vendor product by source 50 via the GUI, and other mappings not shown.

Referring again to FIG. 5, a stage S64 of flowchart 60 encompasses registration module 41 registering each heterogeneous cluster management group in the heterogeneous server environment into registry 43. In the context of FIG. 3, registry 43 would include registrations of heterogeneous cluster management groups 26(1) and 26(2).

Figure 9:
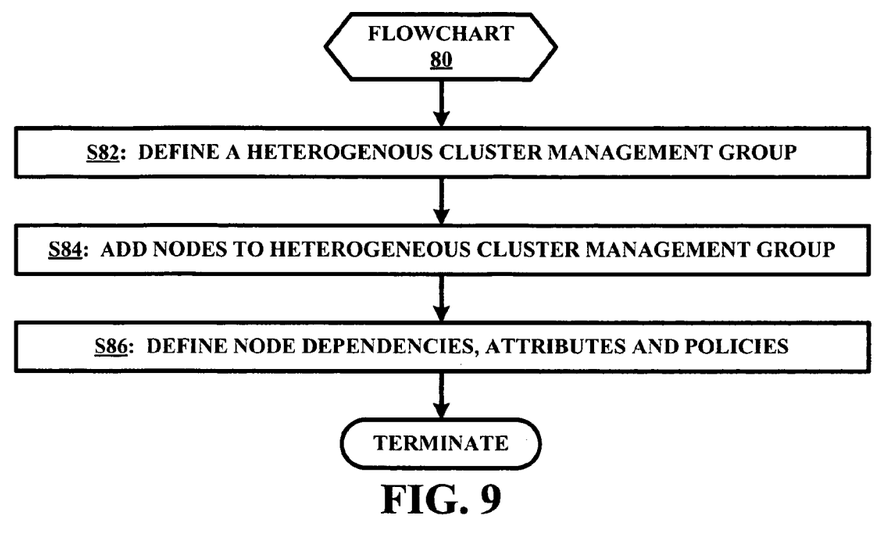
FIG. 9 illustrates a flowchart representative of one embodiment of a heterogeneous cluster management group registration method in accordance with the present invention.
Figure 11:
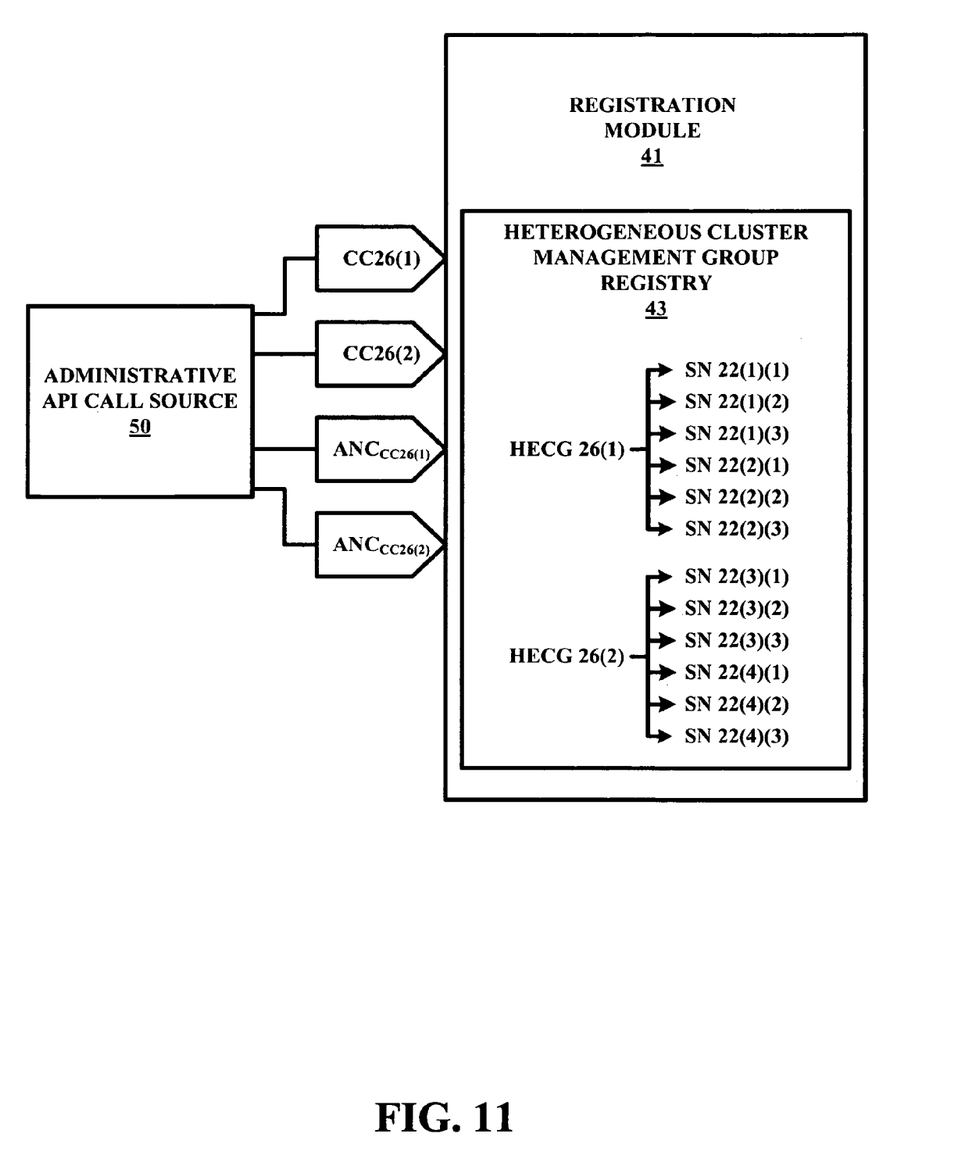
FIG. 11 illustrates an exemplary execution of the flowchart illustrated in FIG. 9 in the context of the exemplary heterogeneous server environment illustrated in FIG. 3.

FIG. 9 illustrates a flowchart 80 representative of one embodiment of stage S64. Referring additionally to FIG. 9, a stage S82 of flowchart 80 encompasses registration module 41 defining each heterogeneous cluster management group. In one embodiment, each heterogeneous cluster management group is defined by the datacenters 20 upon which the group will be allowed to run, by the initial datacenter the group will be run upon and any additional parameters and dependencies. For example, in the context of FIG. 3, heterogeneous cluster management groups 26(1) and 26(2) would both be defined as being allowed to run on all three (3) datacenters 20 with a specification of the initial datacenter and any additional parameters and dependencies. The following are exemplary cluster group creation command CC26(1) and CC26(2) as shown in FIG. 11:

mkhagroup—name: clustergroup26(1)
    allowedsites: datacenter20(1) datacenter20(2) datacenter20(3)
    initialsite: datacenter20(1)
    <additional parameters and dependencies>
    mkhagroup—name: clustergroup26(2)
    allowedsites: datacenter20(1) datacenter20(2) datacenter20(3)
    initialsite: datacenter20(1)
    <additional parameters and dependencies>

A stage S84 of flowchart 80 encompasses registration module 41 adding server nodes to each heterogeneous cluster management group 26. For example, in the context of FIG. 3, server nodes 22(1)(1), 22(1)(2), 22(1,3), 22(2,1), 22(2,2), and 22(2,3) would be added to heterogeneous cluster management group 26(1) and server nodes 22(3)(1), 22(3)(2), 22(3, 3), 22(4,1), 22(4,2), and 22(4,3) would be added to heterogeneous cluster management group 26(2) as exemplary shown in FIG. 9. The following are exemplary add node commands $ANC_{CC26(1)}$ and $ANC_{CC26(2)}$ as shown in FIG. 11:

addnodes—group: clustergroup26(1)
    members: servernode22(1)(1) servernode22(1)(2) servernode22(1)(4) servernode22(2)(1) servernode22(2)(2) servernode22(2)(3)
    addnodes—group: clustergroup26(2)
    members: servernode22(3)(1) servernode22(3)(2) servernode22(3)(3) servernode22(4)(1) servernode22(4)(2) servernode22(4)(3)

A stage S86 of flowchart 80 encompasses registration module 41 defining node dependencies, attributes and policies to factor in the different operational nature of the various server nodes added to a particular heterogeneous cluster management group. For example, in the context of FIG. 3, server nodes 22(1) of heterogeneous cluster management group 26(1) can be Web servers and server nodes 22(2) of heterogeneous cluster management group 26(1) can be database servers whereby the a data reliance by the Web servers on the database servers requires a database server to made online prior a Web server that will be relying on the database server. The following is an exemplary dependency:

cchagroup—name: clustergroup26(1)
    startuporder: servernode22(2) servernode22(1)
    offline errors
    <additional parameters and dependencies>

Upon completion of flowchart 80, registry 43 will contain a mapping of each heterogeneous cluster management group 26 to its respective server nodes 22 as exemplary shown in FIG. 11.

Figure 10:
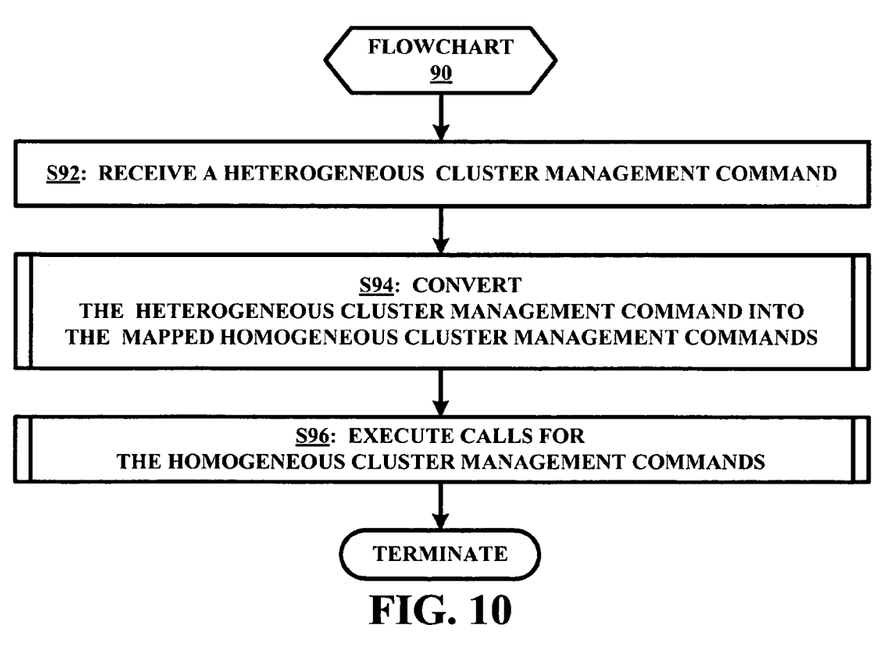
FIG. 10 illustrates a flowchart representative of one embodiment of a cluster management command execution method in accordance with the present invention.

An operation of command execution module 44 based on registry 42, registry 43 and command set 45 will now be described herein. Referring to FIGS. 4 and 10, a stage S92 of flowchart 90 encompasses command execution module 44 receiving a heterogeneous cluster management command from source 50 via API communication module 45. A stage S94 of flowchart 90 encompasses command execution module 44 converting the heterogeneous cluster management command into homogeneous cluster management commands based on the registration mapping performed by registration module 41. A stage S96 of flowchart 90 encompasses command execution module 44 executing calls directed to the homogeneous cluster management commands to the appropriate server nodes 22 of heterogeneous cluster management groups 26.

Figure 12:
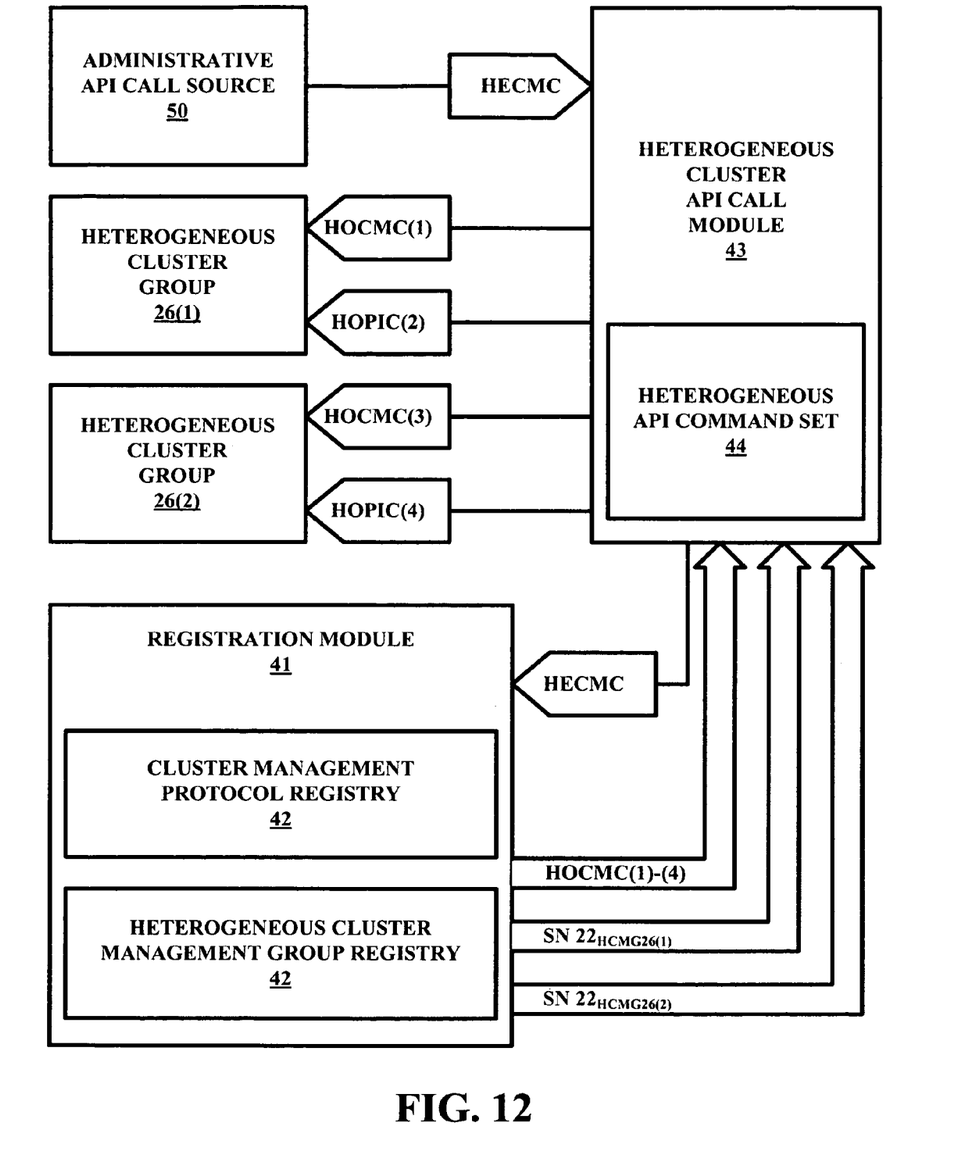
FIG. 12 illustrates an exemplary execution of the flowchart illustrated in FIG. 10 in the context of the exemplary heterogeneous server environment illustrated in FIG. 3.

For example, in the context of FIG. 3, assuming datacenter 20(1) is active, datacenter 20(2) is inactive and for maintenance reasons the administrator has to perform a failover switch from datacenter 20(1) to datacenter 20(2), command execution module 44 would receive a heterogeneous cluster management command HECMC in the form of a failover switch on behalf of datacenters 20(1) and 20(2) as shown in FIG. 12, convert the HECMC command into the HOCMCs (1)-(4) commands mapped to the HECMC as shown in FIGS. 7 and 12, and execute calls directed to HOCMCs(1)-(4) commands to respective managers 23 within the heterogeneous cluster management groups 26 as shown in FIG. 12.

Referring to FIGS. 2-9, the inventive principles of the present invention were explained in the context of the heterogeneous server environment illustrated in FIG. 3 derived from the heterogeneous server pool illustrated in FIG. 2. In practice, those having ordinary skill in the art will appreciate how to apply the aforementioned inventive principles of the present invention to any heterogeneous server environment derived from the heterogeneous server pool illustrated in FIG. 2.

Still referring to FIGS. 2-9, those having ordinary skills in the art will appreciate numerous advantages of the present invention including, but not limited to, addressing the drawbacks of the background art previously described herein. In particular, the advantages of the present invention become more significant as the heterogeneous server environments become more and more complex based on an increase in the number of datacenters, an increase in a number of different cluster management protocols, and/or an increase in the complexity of the dependencies, attributes and policies of the server nodes within a heterogeneous cluster management group.

Referring to FIGS. 2 and 4, in a practical embodiment, modules 41, 44 and 46 of manager 40 are embodied as software modules written in a conventional language and installed within a memory of a server node 30 whereby the processor(s) of the server node 30 can execute modules 41, 44 and 46 to perform various operations of the present invention as described in connection with the illustrations of FIGS. 5-12.

Referring to FIG. 2, an alternative embodiment of a heterogeneous high availability server pool of the present invention consists of an X number of heterogeneous cluster management server nodes 30, where X≧1, and a Y number of homogenous high availability cluster 25 where Y≧1, with each homogenous high availability cluster 25 consisting of a Z number of homogeneous high availability server nodes 22, where Z≧2. In this embodiment, node(s) 30 can be designed to individually manage homogenous high availability clusters 25. The advantage for this embodiment is in establishing a standard cluster management set that is applicable to each homogenous high availability cluster 25 as well as each heterogeneous cluster management group derived from clusters 25 (e.g., heterogeneous cluster management group 26 shown in FIG. 3).

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A computer program product comprising a non-transitory computer usable storage medium tangibly embodying at least one program of instructions executable by a computer to perform operations comprising:

receiving an administrative cluster management command to perform an administrative task for managing a heterogeneous cluster management group comprising a first server cluster and a second server cluster, the administrative cluster management command received in an administrative cluster management protocol, the administrative cluster management protocol comprising cluster group functions, highly available resources functions and server node functions, each of the first cluster and the second cluster comprising a plurality of server nodes, wherein the administrative cluster management command is selected from the group consisting of a server cluster group creation command, a server cluster group deletion command, a server cluster group modification command, a server cluster group start command, a server cluster group stop command, a server cluster group/attribute/policy definition command, a server cluster group/attribute/policy modification command, a highly available resources creation command, a highly available resources deletion command, and a highly available resources modification command;

converting the administrative cluster management command to a first cluster management command in a first distinct cluster management protocol in response to receiving the administrative cluster management command, the first distinct cluster management protocol implemented by the first server cluster;

converting the administrative cluster management command to a second cluster management command in a second distinct cluster management protocol in response to receiving the administrative cluster management command, the second distinct cluster management protocol implemented by the second server cluster, each of the second distinct cluster management protocol, the administrative cluster management protocol, and the first distinct cluster management protocol being different protocols;

sending the first cluster management command to a first server node in the heterogeneous cluster management group, the first server node operating within the first server cluster; and sending the second cluster management command to a second server node in the heterogeneous cluster management group, the second server node operating within the second server cluster.

2. The computer program product of claim 1, wherein the operations further comprise:

registering at least one cluster management protocol including the first distinct cluster management protocol.

3. The computer program product of claim 2, wherein registering the at least one cluster management protocol includes:
   mapping the administrative cluster management command to the first cluster management command to facilitate the conversion of the administrative cluster management command to the first cluster management command.

4. The computer program product of claim 3, wherein the operations further comprise:
   registering a plurality of cluster management protocols including the first distinct cluster management protocol and the second distinct cluster management protocol.

5. The computer program product of claim 4, wherein registering the plurality of distinct cluster management protocols includes:
   mapping the administrative cluster management command to the first cluster management command to facilitate the conversion of the administrative cluster management command to the first cluster management command; and
   mapping the administrative cluster management command to the second cluster management command to facilitate the conversion of the administrative cluster management command to the second cluster management command.

6. The computer program product of claim 1, wherein the operations further comprise:
   registering each server node of the heterogeneous cluster management group to facilitate the sending of the first cluster management command to the first server node of the heterogeneous cluster management group.

7. A server, comprising:
   a processor; and
   a memory storing instructions operable with the processor, the instructions being executed for:
   receiving an administrative cluster management command to perform an administrative task for managing a heterogeneous cluster management group comprising a first server cluster and a second server cluster, the administrative cluster management command received in an administrative cluster management protocol, each of the first cluster and the second cluster comprising a plurality of server nodes, wherein the administrative cluster management command is selected from the group consisting of a server cluster group creation command, a server cluster group deletion command, a server cluster group modification command, a server cluster group start command, a server cluster group stop command, a server cluster group/attribute/policy definition command, a server cluster group/attribute/policy modification command, a highly available resources creation command, a highly available resources deletion command, and a highly available resources modification command;
   converting the administrative cluster management command to a first cluster management command in a first distinct cluster management protocol, the first distinct cluster management protocol implemented by the first server cluster;
   converting the administrative cluster management command to a second cluster management command in a second distinct cluster management protocol, the second distinct cluster management protocol implemented by the second server cluster, each of the second distinct cluster management protocol, the administrative cluster management protocol, and the first distinct cluster management protocol being different protocols;
   sending the first cluster management command to a first server node in the heterogeneous cluster management group, the first server node operating within the first server cluster; and
   sending the second cluster management command to a second server node in the heterogeneous cluster management group, the second server node operating within the second server cluster.

8. The server of claim 7, wherein the instructions are further executed for:
   registering at least one cluster management protocol including the first distinct cluster management protocol.

9. The server of claim 8, wherein registering the at least one cluster management protocol includes:
   mapping the administrative cluster management command to the first cluster management command to facilitate the conversion of the administrative cluster management command to the first cluster management command.

10. The server of claim 9, wherein the instructions are further executed for:
    registering a plurality of cluster management protocols including the first distinct cluster management protocol and the second distinct cluster management protocol.

11. The server of claim 10, wherein registering the plurality of distinct cluster management protocols includes:
    mapping the administrative cluster management command to the first cluster management command to facilitate the conversion of the administrative cluster management command to the first cluster management command; and
    mapping the administrative cluster management command to the second cluster management command to facilitate the conversion of the administrative cluster management command to the second cluster management command.

12. The server of claim 7, wherein the instructions are further executed for:
    registering each server node of the heterogeneous cluster management group to facilitate the sending of the first cluster management command to the first server node of the heterogeneous cluster management group.

13. A method, comprising:
    receiving an administrative cluster management command to perform an administrative task for managing a heterogeneous cluster management group comprising a first server cluster and a second server cluster, the administrative cluster management command received in an administrative cluster management protocol, each of the first cluster and the second cluster comprising a plurality of server nodes, wherein the administrative cluster management command is selected from the group consisting of a server cluster group creation command, a server cluster group deletion command, a server cluster group modification command, a server cluster group start command, a server cluster group stop command, a server cluster group/attribute/policy definition command, a server cluster group/attribute/policy modification command, a highly available resources creation command, a highly available resources deletion command, and a highly available resources modification command;
    converting the administrative cluster management command to a first cluster management command in a first distinct cluster management protocol, the first distinct cluster management protocol implemented by the first server cluster;
    converting the administrative cluster management command to a second cluster management command in a second distinct cluster management protocol, the second distinct cluster management protocol implemented by the second server cluster, each of the second distinct cluster management protocol, the administrative cluster management protocol, and the first distinct cluster management protocol being different protocols;

sending the first cluster management command to a first server node in the heterogeneous cluster management group, the first server node operating within the first server cluster; and sending the second cluster management command to a second server node in the heterogeneous cluster management group, the second server node operating within the second server cluster.

14. The method of claim 13, further comprising:
registering at least one cluster management protocol including the first distinct cluster management protocol.

15. The method of claim 14, wherein registering the at least one cluster management protocol includes:
mapping the administrative cluster management command to the first cluster management command to facilitate the conversion of the administrative cluster management command to the first cluster management command.

16. The method of claim 15, further comprising:
registering a plurality of cluster management protocols including the first distinct cluster management protocol and the second distinct cluster management protocol.

17. The method of claim 16, wherein registering the plurality of cluster management protocols includes:
mapping the administrative cluster management command to the first cluster management command to facilitate the conversion of the administrative cluster management command to the first cluster management command; and mapping the administrative cluster management command to the second cluster management command to facilitate the conversion of the administrative cluster management command to the second cluster management command.

* * * * *